(12) United States Patent
Ellison

(10) Patent No.: US 6,383,428 B1
(45) Date of Patent: May 7, 2002

(54) METHOD FOR PREPARING MOLDED ARTICLE

(75) Inventor: Thomas M. Ellison, Fort Mill, SC (US)

(73) Assignee: The University of Massachusetts, Lowell, MA (US)

( * ) Notice: Subject to any disclaimer, the term of this patent is extended or adjusted under 35 U.S.C. 154(b) by 0 days.

(21) Appl. No.: 09/356,130

(22) Filed: Jul. 17, 1999

(51) Int. Cl.[7] .......................... B27C 43/34; B27C 51/10; B27C 43/06; B27C 43/20
(52) U.S. Cl. ....................... 264/108; 264/510; 264/255; 264/265; 264/266; 264/328.8; 425/120; 425/256; 425/257
(58) Field of Search .................................. 264/265, 510, 264/108, 266, 328.8, 259, 255; 425/449, 256, 80.1, 120, 375, 70, 258, 112; 222/565, 330

(56) References Cited

U.S. PATENT DOCUMENTS

| | | | |
|---|---|---|---|
| 1,391,772 A | * | 9/1921 | Dunham |
| 5,401,457 A | * | 3/1995 | Valyi |
| 5,407,102 A | * | 4/1995 | Freudinger et al. |
| 5,800,771 A | * | 9/1998 | Ohno |
| 6,132,669 A | * | 10/2000 | Valyi et al. |

* cited by examiner

Primary Examiner—Jan H. Silbaugh
Assistant Examiner—Geoffrey P. Shipsides
(74) Attorney, Agent, or Firm—Bachman & LaPointe, P.C.

(57) ABSTRACT

A template is placed over a mold cavity, with the template including a series of orifices which extend over substantially the entire surface of the mold cavity. Molten plastic is passed through the orifices in a pattern corresponding to the shape of the article to be molded, and the molten plastic is formed into a molded article having the shape of the mold cavity.

13 Claims, 3 Drawing Sheets

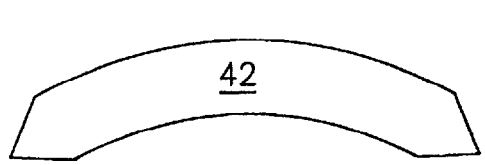
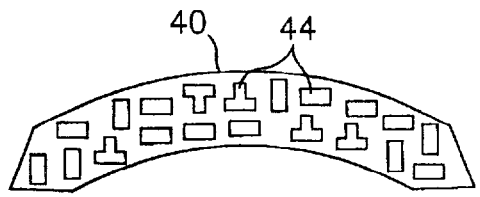
FIG. 5   FIG. 6
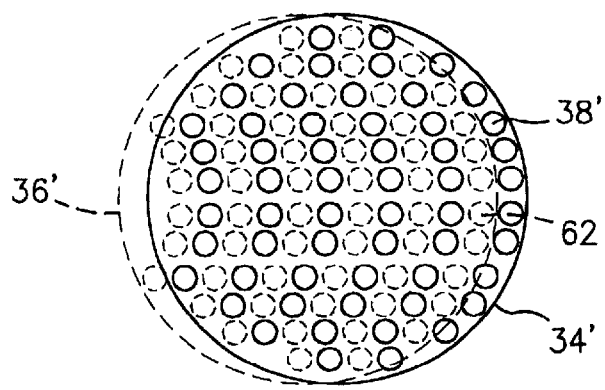
FIG. 7
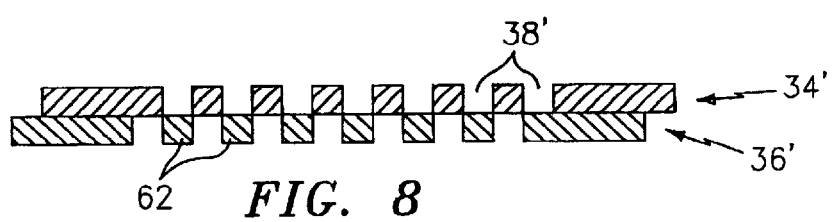
FIG. 8
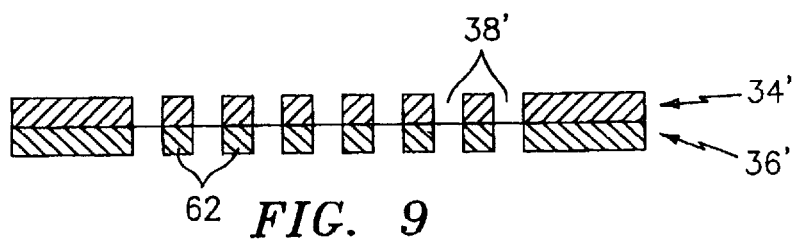
FIG. 9

METHOD FOR PREPARING MOLDED ARTICLE

BACKGROUND OF THE INVENTION

The present invention relates to an efficient and expeditious method and apparatus for forming a molded plastic article, which advantageously prepares such an article with a film as an outer layer thereof.

In accordance with U.S. Pat. No. 5,401,457 for PROCESS FOR FORMING A COLOR COATED ARTICLE, By Emery I. Valyi, Patented Mar. 8, 1995, a process is provided for forming a color coated article. In accordance with the procedure of the '457 patent, a film is placed substantially flat over a mold cavity and deformed by a core half and by molten plastic entering though a sprue. However, the procedure of the '457 patent is difficult to control, particularly when molding parts with large surfaces and sharply varying curvatures. The difficulties increase when the plastic is pressure molded at high enough temperatures to reduce the film strength substantially, as is the case with conventional injection molding procedures.

In accordance with U.S. patent application Ser. No. 09/130,864, filed Aug. 7, 1998, by Emery I. Valyi et al., a color coated article is prepared by depositing molten plastic on a film and forming the film-molten plastic combination in a mold cavity. The molten plastic is delivered either by a curtain from a traversing linear die or as discrete piles or globs from valves in a hot runner manifold or shooting pot. However, it is desirable to improve upon this procedure. In accordance with this procedure, the die coverage is fair to good for rectilinear parts, but poor for parts with significant curvature,'such as wheel covers or automotive parts as fenders. The correction for this with die delivery is to traverse the die laterally, but this is prone to air entrapment as the resin tends to fold on itself. However, to vary the width of the die gap creates a complex die design and a complex control problem. In addition, there is a time delay from the first resin deposit on one film edge until completion of the deposit on the distant film edge.

Valve delivery (hot runner manifold or shooting pot) is an improvement over die delivery for curved parts. Valve delivery allows all of the resin to be deposited at the same time. This is accomplished by using a number of valves and associated electrical connections and controls. However, lateral flow of molten resin deposited in a pile is very slow for most polymers at deposition temperatures. Thus, many valves are needed for uniform coverage, otherwise gaps exist between piles until the piles are forced together at mold closure. This creates problems, such as knit lines and hot spots. Knit lines create structural failure points and hot spots may create adverse visual patterns on the external surface.

It is, therefore, a principal object of the present invention to provide an improved method and apparatus for preparing molded articles.

It is a further object of the present invention to provide a method and apparatus as aforesaid which efficiently and expeditiously prepares curved molded articles, and enables the preparation of such articles with an outer film layer.

Further objects and advantages of the present invention will appear hereinbelow.

SUMMARY OF THE INVENTION

In accordance with the present invention, the foregoing objects and advantages are readily obtained.

The method of the present invention comprises: providing a mold cavity; placing a template over the mold cavity which includes a series of orifices which extend over substantially the entire surface of the mold cavity; passing molten plastic through said orifices in a pattern corresponding to the shape of the article to be molded; and subsequently forming said molten plastic into a molded article having the shape of the mold cavity. The molten plastic may be transferred from the orifices directly to the mold cavity. However, desirably a film is placed over the mold cavity, particularly a colored film, the molten plastic is deposited from the orifices onto the film in said pattern, and the film-molten plastic combination formed in the mold cavity into a molded article having the shape of the mold cavity, wherein the film is an outer layer of the molded article.

In a preferred embodiment, a gate control plate is placed adjacent the template having closed gate areas and open gate areas, the gate control plate is moved into a first closed position wherein the closed gate areas block the orifices and prevent molten plastic from passing therethrough, and into a second open position wherein the open gate areas register with the orifices and allow molten plastic to flow through the orifices.

The apparatus of the present invention comprises: a mold cavity; a template positioned over the mold cavity which includes a series of orifices which extend over substantially the entire surface of the mold cavity; means for transferring molten plastic through the orifices in a pattern corresponding to the shape of the article to be molded; and means for forming the molten plastic into a molded article having the shape of the mold cavity.

Further features and advantages of the present invention will appear hereinbelow.

BRIEF DESCRIPTION OF THE DRAWINGS

The present invention will be more readily understandable from a consideration of the following exemplificative drawings, wherein:

FIG. 5 is a side view of an automobile fender prepared in accordance with the present invention;

FIG. 6 is a side view of a template used in the preparation of the fender of FIG. 5;

FIG. 7 is a top view of the template-gate control assembly;

FIGS. 8–9 are side views of the assembly of FIG. 7 in the closed and open positions, respectively.

DETAILED DESCRIPTION OF PREFERRED EMBODIMENTS

The process and apparatus of the present invention provides a template or molten plastic distribution plate having a pattern of orifices or openings which register with substantially the entire shape of the article being molded. The molten plastic may be delivered through the orifices directly to the mold cavity or desirably onto a film surface which becomes part of the molded article and which forms an outer layer of the molded article. The orifices are provided sufficiently close to one another so as to provide contact between the deposited resin puddles either on the film surface or on the surface of the mold cavity. In addition, the orifices may vary in size and shape in various locations so as to improve resin coverage and/or to increase or decrease heat on the film during film conditioning time prior to mold closure. The orifices or gates may have a variety of shapes, with differing shape being provided on individual templates if desired. For example., they may be round, rectangular, X-shaped, T-shaped, L-shaped or irregularly shaped. Still further, if desired, either the mold cavity half, the film or the resin delivery device may be moved laterally during resin delivery so as to increase contact between resin deposits. This movement may if desired provide resin deposit overlay such that any knit lines become horizontal in part, thus minimizing their effect on part strength. A further advantageous feature of the present invention is to provide a heat source for conditioning the film located adjacent the mold assembly. Thus, this heat source may effectively improve film forming and bonding to the resin as the film is drawn into the mold cavity during mold closure.

Figure 1:
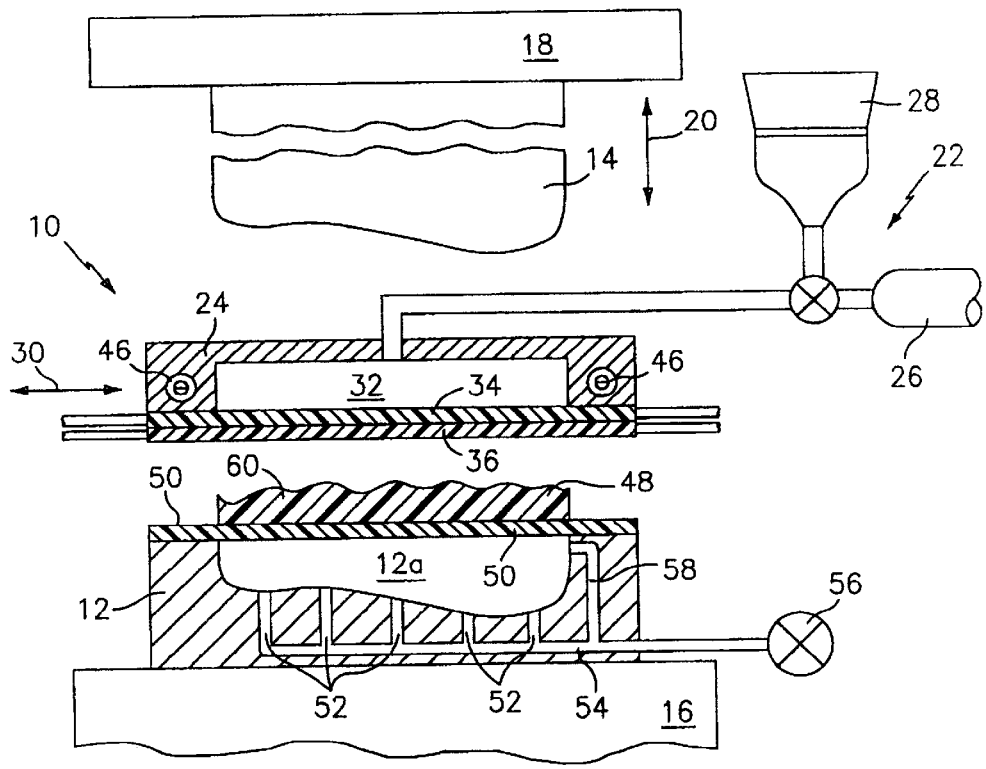
FIG. 1 is a side view of a representative apparatus and process of the present invention.

Referring to FIG. 1, mold assembly 10 is provided having a cavity half 12 with a mold cavity 12a therein and a core half 14 mounted on respective platens 16 and 18. Mold cavity 12a has a shape of the desired molded article and may include a curved portion so as to prepare a curved, molded article, and also a non-planar article. The present invention advantageously can effectively and expeditiously prepare such curved, molded articles. At-least one of the cavity half and core half is reciprocable in the direction of arrow 20 from a mold open to mold closed position and from a closed position to an open position via a suitable motive means (not shown).

An extruder/injection unit 22 is arranged adjacent mold assembly 10 to coact with and couple with hot plastic delivery means, as resin delivery housing 24. The extruder/injection unit 22 may include extruder 26 and resin accumulator 28 which may be separable from the resin delivery housing. The resin delivery housing 24 is relatively reciprocable by suitable motive means (not shown) in the direction of the horizontal arrow 30 from a position adjacent mold cavity 12a to a position spaced from mold cavity 12a and includes a molten resin collection chamber 32 which may if desired be heated. The chamber 32 is supplied with hot, flowable plastic by the extruder/injection unit 22. Depending on the nature of housing 24, the extruder/injection unit 22 may be stationary or reciprocable with the housing. Naturally, other variations in the hot plastic delivery system may be used. For example, the extruder/injection system and hot plastic delivery means may be stationary externally to the press and the mold traversed reciprocably relative thereto. Other variations may be readily contemplated.

Figure 2:
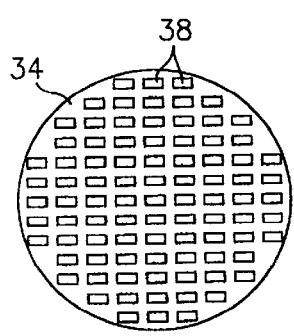
FIGS. 2–4 are top views of representative templates.
Figure 3:
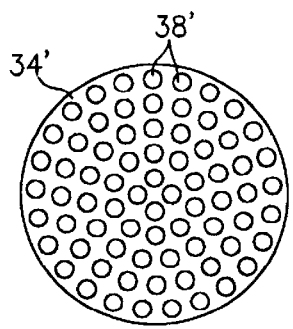
Figure 4:
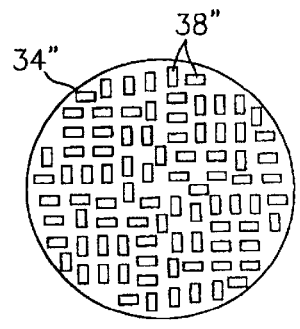

The resin delivery housing 24 includes circular template or distribution plate 34 and adjacent thereto gate control plate or shut off plate 36. A typical template 34 is shown in FIG. 2 and includes a plurality of orifices or gates 38 which extend over substantially the entire surface of mold cavity 12a. In the embodiment of FIG. 2, the orifices are regularly spaced and rectangular; however, template 34' in FIG. 3 uses circular orifices 38' and plate 34" uses irregularly spaced rectangular orifices 38". Naturally also, the template may have any desired shape, such as the semi-circular shape of template 40 in FIG. 6 to coordinate with molded fender 42 in FIG. 5. Orifices 44 in template 40 may have differing shapes as shown rather than uniform shapes.

It is preferred that the template and gate control plate be part of the resin delivery housing. However, these may if desired be separate units moved into and out of engagement with the resin delivery housing. Thus, for example, a defined charge of resin may be supplied to the chamber 32 and the template 34 and plate 36 moved away from the housing after delivery of the resin. Also, it is preferred to use the gate control plate 36, but if desired this may be omitted.

Heating means 46 are provided adjacent mold assembly 10, as for example in housing 24, although naturally other locations can be used. The heating means provides a heat source for conditioning the film and improves film forming and resin bonding to the film as the film is drawn into the mold during mold closure.

Thus, in accordance with the present invention, molten plastic is transferred to resin collection chamber 32. Gate control plate 36 is in the closed position blocking orifices 38. Plate 36 is moved laterally by any convenient motive means (not shown) to permit flow of molten resin 48 onto film 50. Plate 36 may be moved into the closed position at the end of the delivery cycle to cut the resin flow stream. Template 34 and plate 36 may be plastic coated as for example with Teflon in order to minimize resin stringing or drool from the delivery device. Stringing or drool may be further reduced with reversed pressure from accumulator 28 or extruder 26, if necessary. Resin delivery may be made in partial charges as may be needed for inserting material to be embedded in the molding resin. The film 50 may be a precut film or blank fed over mold cavity 12a by any desired means, or may be from a continuous roll which is cut in place.

Fluid pressure may then be applied to mold cavity 12a under blank or film 50, as through channels 52 connected through a joint manifold 54, with pressure control means 56. The fluid usually used is air, but may also be an inert gas if the material of blank 50 so requires. Alternatively, fluid pressure may be applied through channel 58 in cavity half 12 directly beneath film blank or film 50 in order to properly hold the film in place. Preferably, a plurality of locations, or a continuous channel, are provided around the circumference of the film directly beneath the film. Also, these may be valved separately from channels 52 or used instead of channels 52.

An accurately metered amount of molten plastic is deposited on film 50 from housing 24 through orifices 38, namely that which corresponds substantially to the molded article to be formed in mold cavity 12a by mold cavity half 12 and core half 14 in the mold closed position. If desired, a frame (not shown) can be provided adjacent the edges of the deposited resin 48 to insure that the resin will not leak outside the desired area. The frame can then be moved away when the mold is closed or retained as part of the mold assembly. However, the plastic may be of sufficient viscosity to avoid lateral flow. A dam may be used if the viscosity is lowered or if lateral flow is a problem. No more pressure should be applied underneath the blank via fluid channels 52 and 58 than that sufficient to support the metered amount 48 of plastic deposited on film 50. Desirably, the air pressure is variable depending on product requirements. Indeed, vacuum may be used during forming. As schematically indicated in FIG. 1, that metered amount 48 will comprise a plastic layer that will conform to the flat surface of the blank on one side, while its opposite surface will have a slightly uneven surface 60 as clearly shown in FIG. 1, showing traces of the viscous flow pattern that will have emerged from orifices 38. However, the closely spaced orifices will greatly minimize the wavy nature of surface 60.

Alternatively, one polymer could be deposited in a designed pattern, and a second or a plurality of second polymers deposited in a designed pattern. This could be done with one or more extruders feeding for example separate channels to deposit a predesigned pattern of multiple resins. As a further alternative, one could sequentially feed polymers of different characteristics to provide designed properties in the finished product.

Before releasing the hot plastic into the space above blank 50, the mold cavity 12a is pressurized as described above, as by air pressure entering through channels 52. Since the finished product is usually thin, while having a large surface area, the weight of metered plastic 48 is relatively low and the average static pressure it exerts upon the film or blank 50 is low as well. Hence, relatively low pressure in the mold cavity will suffice to keep the blank 50 from sagging under the weight of the metered plastic, even when blank 50 is heated by contact with the metered plastic. For example, a metered amount of plastic measuring 2'×4'×0.5", made of plastic weighing 0.05 pounds per cubic inch, will exert a pressure of 0.025 psi over the said area. This amounts to very slight over pressure to support the blank, with the result that said blank will not bulge (balloon) upward excessively when pressure is first applied under it. In exceptional instances, the layer of hot plastic being applied over the blank may be of much greater depth. Even then, the above indicated pressure would not cause excessive bulging.

After deposition of plastic layer 48 on film 50, housing 24, including template 34 and plate 36, is moved from between cavity half 12 and core half 14 and mold 10 is closed, as by moving core half into mold cavity 12a. This results in forming the film and deposited plastic into a composite laminate in the shape of the closed mold cavity in an expeditious and convenient and effective manner, even when the part has a curved surface. Naturally, if a film is not used, the plastic is deposited directly onto the mold cavity 12a and the final part formed therein by the core half moving into the mold cavity.

The blank is preferably plastic, and any desired plastic material may be used for the blank or molten plastic material, for example, polyolefins, polyvinyl chloride, polystyrene, polycarbonates, etc. Any thermoplastic and/or thermoset material may be used for the molten material, such as for example, structural foam, rim, epoxy, polyurethanes, bulk molding compound, sheet molding compound, etc. The blank may be cut or stamped from a web and a supply of blanks having the size and shape to fit over mold cavity 12a maintained adjacent mold 10 for transfer to the mold as described above. The depth of color on the blank may naturally be varied depending on needs. One should naturally consider the thinning of the blank or film during processing and adjust the color depth to the amount of deformation any given portion of the blank or film is to undergo. Thus, for example, thicker paint coatings may be applied to selective blank or film locations that are to obtain greater deformation during processing in order to obtain uniformity of color in the final molded product. The blank or film may, for example, be intaglio-printed. The blank may be applied to the mold with robot means or removably adhered to a carrier film strip. The carrier film strip may be provided with means to register the position of the blanks relative to the mold half onto which the blanks are to be placed, e.g., edge perforations. The carrier, with the blanks attached, may then be supplied from a roll. Once the blank and mold are juxtaposed, suction is applied to the edge of the blank by the mold, as through channels, sufficient to separate the blank from the carrier strip. Naturally, other transfer means may readily be used.

FIG. 7 is a top view of template 34' with orifices 38' and gate control plate 36' shown in phantom with closed gate areas 62 in the gate open position, i.e., gate control plate 36' is moved laterally so that orifices 38' are Open. FIGS. 8 and 9 show the template 34' and plate 36' in a side view, with FIG. 8 showing the gate closed position and FIG. 9 showing the gate open position. Naturally, the same arrangement is used irrespective of the shape and orientation of the orifices.

Figure 10:
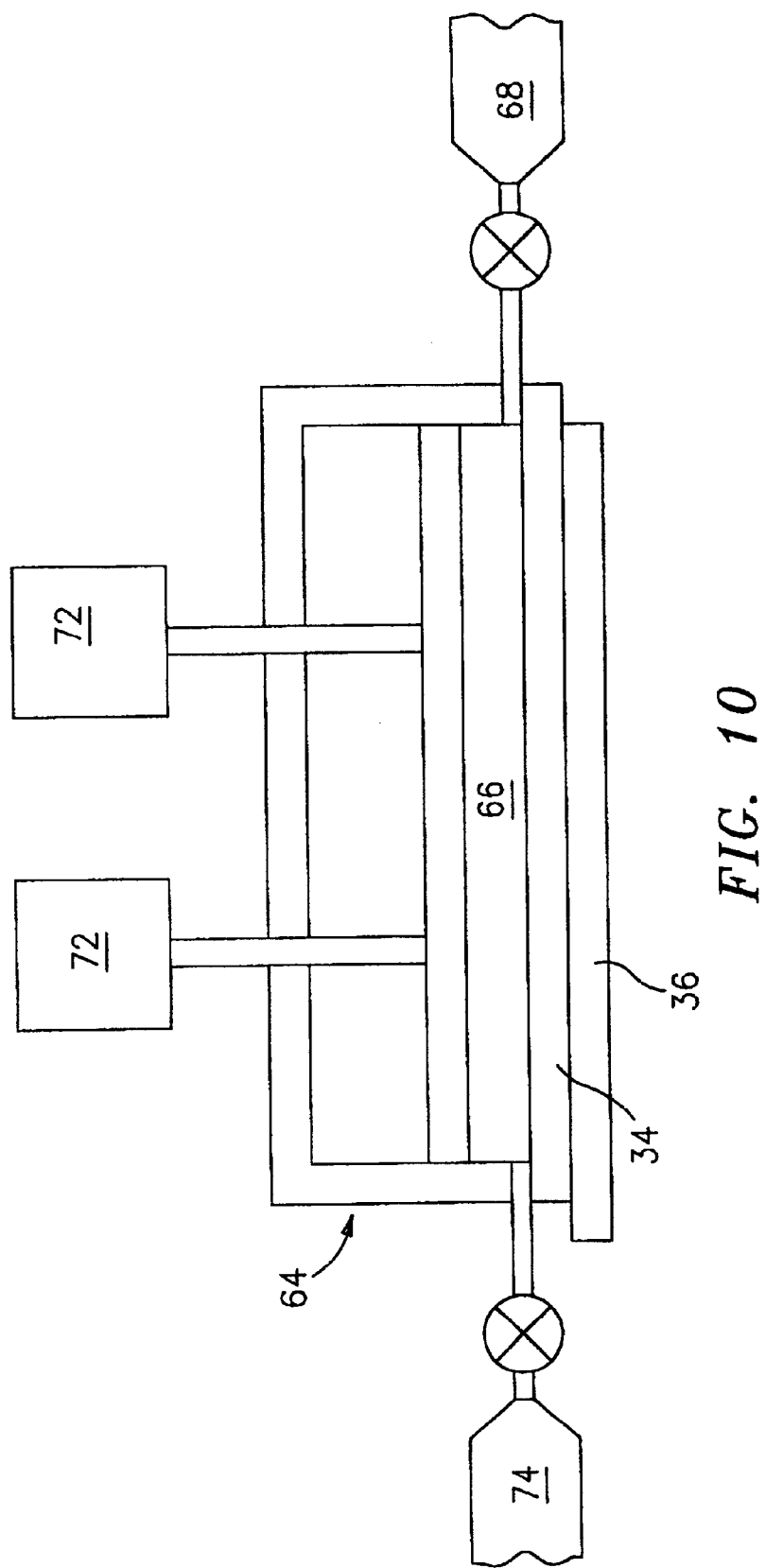
FIG. 10 is an alternate embodiment of a resin delivery housing.

FIG. 10 shows an alternate embodiment with a dual resin deposit apparatus. In this arrangement, resin delivery housing 64 is provided with resin collection chamber 66. Resin from first extruder 68 fills chamber 66 forcing plate 70 to retract. Gate control plate 36 i.5 in the closed position. Once the metered shot size is delivered to chamber 66, plate 36 is opened, pistons 72 are activated and the shot is discharged through template 34. The second polymer is then delivered to chamber 66 from second extruder 74 in the same manner as for the first shot. This arrangement permits considerable versatility and different product profiles. For example, one shot could be virgin resin and the second recycled resin, one shot could have short fiber and/or mica filled resin and the second shot could have long fiber filled resin. Naturally, many variations of the foregoing can be contemplated.

The present invention readily lends itself to the use of fiber filled resins, such as long fibers in the range of one-half inch to 2 inches, as for example with rectangular orifices which permit easy passage of the fibers through the orifices. The orifices are advantageously operative to direct fibers to specific or desired locations in the mold cavity and/or on the film. Also, if desired, the effect of gaps between the gates as the resin contacts the film or mold surface can be minimized by moving the apparatus with a lateral or circular motion. The distance of movement would be the distance between the gates or orifices.

While the foregoing procedure is aimed primarily at application in the exterior of vehicles and especially for curved parts, it should be noted that there are many other types of components that would benefit from the subject process of compression molding with a colored finish and with an accurately molded article, particularly for large household appliances and architectural components.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. Method for the preparation of a molded article which comprises:

providing a mold cavity;

placing a template over said mold cavity which includes a series of orifices which extend over substantially the entire surface of the mold cavity;

passing molten plastic through said orifices in a pattern corresponding to the shape of the article to be molded;

subsequently forming said molten plastic into a molded article having the shape of the mold cavity; and including placing a gate control plate adjacent said template, said gate control plate having closed areas and open areas, moving said gate control plate into a first closed position wherein the closed areas block the orifices and prevent molten plastic from passing therethrough, and moving said gate control plate into a second open position wherein the open areas register with the orifices and allow said passing of said molten plastic by flow through said orifices.

2. Method according to claim 1, wherein said molten plastic is transferred from said orifices directly to said mold cavity.

3. Method according to claim 1, including the step of placing a film over said mold cavity, depositing molten plastic from said orifices onto said film in said pattern, and forming the film-molten plastic combination in said mold cavity into a molded article having the shape of said mold cavity, wherein said film is an outer layer of the molded article.

4. Method according to claim 1, including the step of preparing a curved molded article.

5. Method according to claim 1, wherein said orifices are spaced close together so that molten plastic from molten plastic streams delivered from the orifices contact each other when the molten plastic streams are deposited on a surface.

6. Method according to claim 1, including the step of providing at least some of said orifices with a shape selected from the group consisting of circular, rectangular, T-shaped, L-shaped and X-shaped.

7. Method according to claim 3, including providing a mold assembly including a mold core and mold cavity, and including a heating source adjacent said mold assembly, and heating the film by said heating source.

8. Method according to claim 3, including the step of placing a colored film over said mold cavity, wherein said colored film is an outer layer of said molded article.

9. Method according to claim 1, including the step of providing fibers in said plastic.

10. Method according to claim 9, including the step of directing said fibers to specific locations by said orifices.

11. Method according to claim 1, including passing a first molten plastic through said orifices, followed passing a second dissimilar molten plastic through said orifices.

12. Method according to claim 1, including delivering an amount of molten plastic to a chamber and discharging the metered amount of plastic from the chamber through the template.

13. Method according to claim 1, including positioning said gate control plate beneath said template and in contacting relationship therewith.

* * * * *